US012545546B2

(12) United States Patent
Doi

(10) Patent No.: US 12,545,546 B2
(45) Date of Patent: Feb. 10, 2026

(54) IMAGE FORMING SYSTEM, IMAGE FORMING APPARATUS, AND RECORDING MEDIUM

(71) Applicant: Konica Minolta, Inc., Tokyo (JP)

(72) Inventor: Junichi Doi, Musashino (JP)

(73) Assignee: Konica Minolta, Inc., Tokyo (JP)

(*) Notice: Subject to any disclaimer, the term of this patent is extended or adjusted under 35 U.S.C. 154(b) by 129 days.

(21) Appl. No.: 18/339,459

(22) Filed: Jun. 22, 2023

(65) Prior Publication Data
US 2024/0017957 A1 Jan. 18, 2024

(30) Foreign Application Priority Data

Jul. 15, 2022 (JP) ................. 2022-114078

(51) Int. Cl.
B65H 37/04 (2006.01)
B65H 35/00 (2006.01)
B65H 43/00 (2006.01)

(52) U.S. Cl.
CPC ............ B65H 43/00 (2013.01); B65H 35/00 (2013.01); B65H 37/04 (2013.01); B65H 2557/64 (2013.01)

(58) Field of Classification Search
CPC .... B65H 2557/64; B65H 43/00; B65H 35/00; B65H 37/04
See application file for complete search history.

(56) References Cited

U.S. PATENT DOCUMENTS

2017/0032228 A1* 2/2017 Wakai ................. G06K 15/023
2020/0130971 A1* 4/2020 Kawabata .......... G03G 15/5029
2020/0192261 A1* 6/2020 Ogata ................ G03G 15/5025

FOREIGN PATENT DOCUMENTS

JP 2006-195414 A 7/2006
JP 2015013386 A * 1/2015
JP 2016224343 A * 12/2016

* cited by examiner

Primary Examiner — Jennifer Bahls
(74) Attorney, Agent, or Firm — Osha Bergman Watanabe & Burton LLP

(57) ABSTRACT

An image forming system includes: an image forming apparatus that forms an image on a recording medium; a post-processing device that executes post-processing to the recording medium on which the image is formed by the image forming apparatus; a physical property detector that detects physical property information of the recording medium; and a hardware processor that determines a restriction content of the post-processing based on registered post-processing restriction information depending on the physical property information having been detected.

11 Claims, 9 Drawing Sheets

FIG. 3A

CUTTING FUNCTION

| PAPER TYPE | BASIC WEIGHT [gsm] | STIFFNESS [mN] | ELECTRICAL RESISTANCE [MΩ] | WATER CONTENT [%] | POST-PROCESSING RESTRICTION NUMBER [SHEET] |
|---|---|---|---|---|---|
| COATED PAPER | LESS THAN 100 | 0 | 0 | 0 | 100 |
| COATED PAPER | LESS THAN 100 | 0 | $10^4$ | 10 | 90 |
| COATED PAPER | LESS THAN 100 | 50 | 0 | 0 | 90 |
| COATED PAPER | LESS THAN 100 | 50 | $10^4$ | 10 | 80 |
| COATED PAPER | 101 TO 200 | 50 | 0 | 0 | 80 |
| COATED PAPER | 101 TO 200 | 50 | $10^4$ | 10 | 70 |
| COATED PAPER | 101 TO 200 | 50 | 0 | 0 | 70 |
| COATED PAPER | 101 TO 200 | 50 | $10^4$ | 10 | 60 |
| COATED PAPER | 101 TO 200 | 200 | 0 | 0 | 70 |
| COATED PAPER | 101 TO 200 | 200 | $10^4$ | 10 | 60 |
| COATED PAPER | 101 TO 200 | 200 | 0 | 0 | 60 |
| COATED PAPER | 101 TO 200 | 200 | $10^4$ | 10 | 50 |
| COATED PAPER | 101 TO 200 | 200 | 0 | 0 | 35 |
| COATED PAPER | 101 TO 200 | 200 | $10^4$ | 10 | 30 |
| COATED PAPER | MORE THAN 201 | 200 | 0 | 0 | 30 |
| COATED PAPER | MORE THAN 201 | 200 | $10^4$ | 10 | 25 |
| COATED PAPER | MORE THAN 201 | 200 | 0 | 0 | 30 |
| COATED PAPER | MORE THAN 201 | 200 | $10^4$ | 10 | 25 |
| COATED PAPER | MORE THAN 201 | 1000 | 0 | 0 | 25 |
| COATED PAPER | MORE THAN 201 | 1000 | $10^4$ | 10 | 20 |
| COATED PAPER | MORE THAN 201 | 1000 | 0 | 0 | 15 |
| COATED PAPER | MORE THAN 201 | 1000 | $10^4$ | 10 | 10 |
| COATED PAPER | MORE THAN 201 | 1000 | 0 | 0 | 10 |
| COATED PAPER | MORE THAN 201 | 1000 | $10^4$ | 10 | INEXECUTABLE |

FIG. 3B

CUTTING FUNCTION

| PAPER TYPE | BASIC WEIGHT [gsm] | STIFFNESS [mN] | ELECTRICAL RESISTANCE [MΩ] | WATER CONTENT [%] | POST-PROCESSING RESTRICTION NUMBER [SHEET] |
|---|---|---|---|---|---|
| NON-COATED PAPER | LESS THAN 100 | 0 | $10^3$ | 0 | 95 |
| NON-COATED PAPER | LESS THAN 100 | 0 | $10^3$ | 10 | 85 |
| NON-COATED PAPER | LESS THAN 100 | 0 | $10^5$ | 0 | 85 |
| NON-COATED PAPER | LESS THAN 100 | 0 | $10^5$ | 10 | 75 |
| NON-COATED PAPER | LESS THAN 100 | 50 | $10^3$ | 0 | 75 |
| NON-COATED PAPER | LESS THAN 100 | 50 | $10^3$ | 10 | 65 |
| NON-COATED PAPER | LESS THAN 100 | 50 | $10^5$ | 0 | 65 |
| NON-COATED PAPER | LESS THAN 100 | 50 | $10^5$ | 10 | 55 |
| NON-COATED PAPER | 101 TO 200 | 50 | $10^3$ | 0 | 65 |
| NON-COATED PAPER | 101 TO 200 | 50 | $10^3$ | 10 | 55 |
| NON-COATED PAPER | 101 TO 200 | 50 | $10^5$ | 0 | 55 |
| NON-COATED PAPER | 101 TO 200 | 50 | $10^5$ | 10 | 45 |
| NON-COATED PAPER | 101 TO 200 | 200 | $10^3$ | 0 | 30 |
| NON-COATED PAPER | 101 TO 200 | 200 | $10^3$ | 10 | 25 |
| NON-COATED PAPER | 101 TO 200 | 200 | $10^5$ | 0 | 25 |
| NON-COATED PAPER | 101 TO 200 | 200 | $10^5$ | 10 | 20 |
| NON-COATED PAPER | MORE THAN 201 | 200 | $10^3$ | 0 | 25 |
| NON-COATED PAPER | MORE THAN 201 | 200 | $10^3$ | 10 | 20 |
| NON-COATED PAPER | MORE THAN 201 | 200 | $10^5$ | 0 | 20 |
| NON-COATED PAPER | MORE THAN 201 | 200 | $10^5$ | 10 | 15 |
| NON-COATED PAPER | MORE THAN 201 | 1000 | $10^3$ | 0 | 10 |
| NON-COATED PAPER | MORE THAN 201 | 1000 | $10^3$ | 10 | 5 |
| NON-COATED PAPER | MORE THAN 201 | 1000 | $10^5$ | 0 | 5 |
| NON-COATED PAPER | MORE THAN 201 | 1000 | $10^5$ | 10 | INEXECUTABLE |

FIG. 4A

STAPLING FUNCTION

| PAPER TYPE | BASIC WEIGHT [gsm] | STIFFNESS [mN] | ELECTRICAL RESISTANCE [MΩ] | WATER CONTENT [%] | POST-PROCESSING RESTRICTION NUMBER [SHEET] |
|---|---|---|---|---|---|
| COATED PAPER | LESS THAN 100 | 0 | 0 | 0 | 90 |
| | | 0 | 0 | 10 | 80 |
| | | 0 | $10^4$ | 0 | 80 |
| | | 0 | $10^4$ | 10 | 70 |
| | | 50 | 0 | 0 | 70 |
| | | 50 | 0 | 10 | 60 |
| | | 50 | $10^4$ | 0 | 60 |
| | | 50 | $10^4$ | 10 | 50 |
| | 101 TO 200 | 50 | 0 | 0 | 60 |
| | | 50 | 0 | 10 | 50 |
| | | 50 | $10^4$ | 0 | 50 |
| | | 50 | $10^4$ | 10 | 40 |
| | | 200 | 0 | 0 | 25 |
| | | 200 | 0 | 10 | 20 |
| | | 200 | $10^4$ | 0 | 20 |
| | | 200 | $10^4$ | 10 | 15 |
| | MORE THAN 201 | 200 | 0 | 0 | 20 |
| | | 200 | 0 | 10 | 15 |
| | | 200 | $10^4$ | 0 | 15 |
| | | 200 | $10^4$ | 10 | 10 |
| | | 1000 | 0 | 0 | 5 |
| | | 1000 | 0 | 10 | INEXECUTABLE |
| | | 1000 | $10^4$ | 0 | INEXECUTABLE |
| | | 1000 | $10^4$ | 10 | INEXECUTABLE |

FIG. 4B

STAPLING FUNCTION

| PAPER TYPE | BASIC WEIGHT [gsm] | STIFFNESS [mN] | ELECTRICAL RESISTANCE [MΩ] | WATER CONTENT [%] | POST-PROCESSING RESTRICTION NUMBER [SHEET] |
|---|---|---|---|---|---|
| NON-COATED PAPER | LESS THAN 100 | 0 | $10^3$ | 0 | 85 |
| | | 0 | $10^3$ | 10 | 75 |
| | | 0 | $10^5$ | 0 | 75 |
| | | 0 | $10^5$ | 10 | 65 |
| | | 50 | $10^3$ | 0 | 65 |
| | | 50 | $10^3$ | 10 | 55 |
| | | 50 | $10^5$ | 0 | 55 |
| | | 50 | $10^5$ | 10 | 45 |
| | 101 TO 200 | 50 | $10^3$ | 0 | 55 |
| | | 50 | $10^3$ | 10 | 45 |
| | | 50 | $10^5$ | 0 | 45 |
| | | 50 | $10^5$ | 10 | 35 |
| | | 200 | $10^3$ | 0 | 20 |
| | | 200 | $10^3$ | 10 | 15 |
| | | 200 | $10^5$ | 0 | 15 |
| | | 200 | $10^5$ | 10 | 10 |
| | MORE THAN 201 | 200 | $10^3$ | 0 | 15 |
| | | 200 | $10^3$ | 10 | 10 |
| | | 200 | $10^5$ | 0 | 10 |
| | | 200 | $10^5$ | 10 | 5 |
| | | 1000 | $10^3$ | 0 | INEXECUTABLE |
| | | 1000 | $10^3$ | 10 | INEXECUTABLE |
| | | 1000 | $10^5$ | 0 | INEXECUTABLE |
| | | 1000 | $10^5$ | 10 | INEXECUTABLE |

| PAPER TYPE | BASIC WEIGHT [gsm] | STIFFNESS [mN] | ELECTRICAL RESISTANCE [MΩ] | WATER CONTENT [%] | POST-PROCESSING RESTRICTION NUMBER [SHEET] |
|---|---|---|---|---|---|
| COATED PAPER | 101 TO 200 | 50 | 0 | 0 | 70 |
| | | | | 10 | 60 |
| | | | $10^4$ | 0 | 60 |
| | | | | 10 | 50 |
| | | 200 | 0 | 0 | 35 |
| | | | | 10 | 30 |
| | | | $10^4$ | 0 | 30 |
| | | | | 10 | 25 |

} × 0.93
+
} × (1 − 0.93)

⇩

(2)

| PAPER TYPE | BASIC WEIGHT [gsm] | STIFFNESS [mN] | ELECTRICAL RESISTANCE [MΩ] | WATER CONTENT [%] | POST-PROCESSING RESTRICTION NUMBER [SHEET] |
|---|---|---|---|---|---|
| COATED PAPER | 101 TO 200 | 60 | 0 | 0 | 68 |
| | | | | 10 | 58 |
| | | | $10^4$ | 0 | 58 |
| | | | | 10 | 48 |

} × 0.7
+
} × (1 − 0.7)

⇩

(3)

| PAPER TYPE | BASIC WEIGHT [gsm] | STIFFNESS [mN] | ELECTRICAL RESISTANCE [MΩ] | WATER CONTENT [%] | POST-PROCESSING RESTRICTION NUMBER [SHEET] |
|---|---|---|---|---|---|
| COATED PAPER | 101 TO 200 | 60 | 3000 | 0 | 65 |
| | | | | 10 | 55 |

× 0.3
+
× (1 − 0.3)

⇩

(4)

| PAPER TYPE | BASIC WEIGHT [gsm] | STIFFNESS [mN] | ELECTRICAL RESISTANCE [MΩ] | WATER CONTENT [%] | POST-PROCESSING RESTRICTION NUMBER [SHEET] |
|---|---|---|---|---|---|
| COATED PAPER | 101 TO 200 | 60 | 3000 | 7 | 58 |

IMAGE FORMING SYSTEM, IMAGE FORMING APPARATUS, AND RECORDING MEDIUM

CROSS-REFERENCE TO RELATED APPLICATIONS

The entire disclosure of Japanese patent Application No. 2022-114078, filed on Jul. 15, 2022, is incorporated herein by reference.

BACKGROUND

Technical Field

The present invention relates to an image forming system, an image forming apparatus, and a non-transitory computer-readable recording medium storing instructions.

Description of Related Art

Conventionally, when post-processing such as cutting, folding, and stapling is performed for a printed matter, if the number of sheets equal to or more than the number of sheets processable by a post-processing machine is processed at one time, defects such as damage of the post-processing machine and processing failures (for example, incomplete cutting, incomplete binding of staples, and the like) occur. It is therefore common to restrict the number of sheets processable at one time by the post-processing machine. However, if the number of sheets to be processed at one time is restricted more than necessary, a functional efficiency of the post-processing machine would decrease. It has been necessary to appropriately set restriction content of post-processing so as not to cause a defect of the post-processing machine and not to decrease the functional efficiency of the post-processing machine. For example, an image forming apparatus (see JP 2006-195414 A) that sets restriction content based on a paper type, a basic weight, and a size for each sheet type has been proposed.

In the technique disclosed in JP 2006-195414 A, a table of post-processing restriction information is created in accordance with recording sheets classified by a paper type, basic weight, size, and the like, and whether post-processing can be executed is determined based on the post-processing restriction information for each classification of the recording sheets.

As described above, JP 2006-195414 A proposes a technique for setting post-processing restriction information for each classification of recording sheets classified by the paper type, basic weight, size, and the like. In such a technique, a table of post-processing restriction information is created based on the paper type, basic weight, size, and the like of a representative sheet. However, even if the paper type, basic weight, and size are the same, physical properties (for example, stiffness or the like) of sheet of different brands are different. Therefore, if the post-processing machine executes the post-processing based on the same restriction information, the post-processing machine would have troubles in some cases. In addition, even if the brand, paper type, basic weight, and size are the same, due to a change in a physical property such as the water content of the sheet under an influence of the environment, for example, a failure of the post-processing machine occurs in some cases when the post-processing is executed based on the same restriction information.

SUMMARY

One or more embodiments of the present invention appropriately set a restriction content of a post-processing function depending on physical property information of a recording medium.

According to an aspect of the present invention, an image forming system comprises: an image forming apparatus that forms an image on a recording medium; a post-processing device that executes post-processing to the recording medium on which the image is formed by the image forming apparatus; a physical property detector that detects physical property information of the recording medium; and a hardware processor that determines a restriction content of the post-processing based on registered post-processing restriction information depending on the physical property information having been detected.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 3A and 3B are diagrams each showing a data example 1 of registered post-processing restriction information in the image forming system according to the first embodiment of the present invention;

FIGS. 4A and 4B are diagrams each showing a data example 2 of the registered post-processing restriction information in the image forming system according to the first embodiment of the present invention;

FIG. 5 is a diagram for describing a method of calculating an upper limit of the number of sheets post-processable at one time by a post-processing machine in the image forming system according to the first embodiment of the present invention;

DETAILED DESCRIPTION OF EMBODIMENTS

Figure 1:
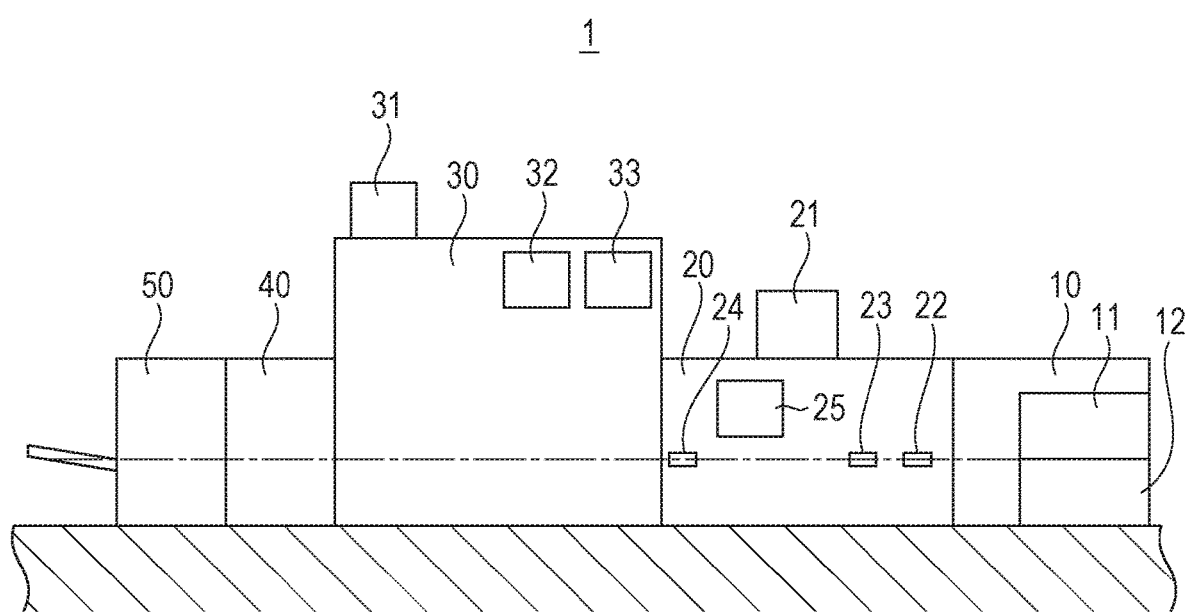
FIG. 1 is a diagram showing a schematic configuration of an image forming system according to a first embodiment of the present invention.

Hereinafter, embodiments of the present invention will be described with reference to the drawings. However, the scope of the invention is not limited to the disclosed embodiments. In the present specification and drawings, constituent elements having substantially the same function or configuration are denoted by the same reference numerals, and redundant description is omitted.

First Embodiment

[Schematic Configuration of Image Forming System]

FIG. 1 is a diagram showing a schematic configuration of an image forming system 1 according to a first embodiment of the present invention. Although FIG. 1 shows only basic components of the image forming system 1 according to the present embodiment, the configuration of the image forming system 1 of the present invention is not limited to the example shown in FIG. 1.

As shown in FIG. 1, the image forming system 1 includes a sheet feeding apparatus 10, a physical property detector (medium detection apparatus 20), an image forming apparatus 30, and a post-processing device (a cutter 40 and a stapler 50). The sheet feeding apparatus 10, the medium detection apparatus 20, the image forming apparatus 30, the cutter 40, and the stapler 50 are connected in that order from upstream to downstream in a conveyance direction of a recording medium.

The sheet feeding apparatus 10 includes a container (an example of a recording medium feeder) that stores recording media, and feeds the recording media to the image forming apparatus 30. The sheet feeding apparatus 10 includes a sheet feeding tray 11 and a sheet feeding tray 12 as containers that store recording media. In each of the sheet feeding tray 11 and the sheet feeding tray 12, sheets having the same paper type, basis weight, and the like (the same type) can be accommodated, and sheets having different paper types, basis weights, and the like (different types) can be accommodated. In the present embodiment, an example will be described in which a printing sheet (hereinafter abbreviated as a sheet) is used as a recording medium on which an image is formed. However, the present invention is not limited to the sheet, and, for example, a cell, a film, a fabric, or the like can be also used. The sheet feeding apparatus 10 discharges a sheet to the medium detection apparatus 20 and feeds the sheet to the image forming apparatus 30 via the medium detection apparatus 20.

The medium detection apparatus 20 (the physical property detector and a determiner) is disposed between the recording medium feeder (the sheet feeding apparatus 10) and the image forming apparatus 30, and includes an operation display unit 21, a stiffness detector 22, an electrical resistance detector 23, a water content detector 24, and a determiner 25. The physical property detector (the stiffness detector 22, the electrical resistance detector 23, and the water content detector 24 of the medium detection apparatus 20) detects physical property information of the recording medium (sheet) fed by the sheet feeding apparatus 10. In addition, the determiner (the determiner 25 of the medium detection apparatus 20) determines restriction content of post-processing for the recording medium based on registered post-processing restriction information (described later) in accordance with (depending on) the detected physical property information. Furthermore, the medium detection apparatus 20 outputs the determined restriction content of the post-processing for the recording medium to a controller 33 (described later) of the image forming apparatus 30, and feeds the detected sheet and a sheet discharged from another sheet feeding apparatus 10 to the image forming apparatus 30. Note that the physical property information is information indicating a physical property that changes due to an influence of a type and a location environment of the recording medium.

The image forming apparatus 30 is an example of an image forming apparatus that forms an image on a recording medium (sheet) fed via the medium detection apparatus 20 by an electrophotographic method. For example, the image forming apparatus 30 forms a color image on a sheet in a tandem format in which toner images of four colors of yellow (Y), magenta (M), cyan (C), and black (K) are superimposed. The image forming apparatus 30 includes an operation display unit 31, an image former 32, and the controller 33.

The post-processing device (the cutter 40 and the stapler 50) executes post-processing for the recording medium on which an image is formed by the image forming apparatus 30. The cutter is an example of a post-processing machine, and executes cutting processing on a sheet on which an image is formed by the image forming apparatus 30 in accordance with an instruction from the controller 33 of the image forming apparatus 30. The stapler 50 is an example of a post-processing machine, and executes binding processing on a sheet on which an image is formed by the image forming apparatus 30 in accordance with an instruction from the controller 33 of the image forming apparatus 30.

[Functional Configuration of Image Forming System]

Figure 2:
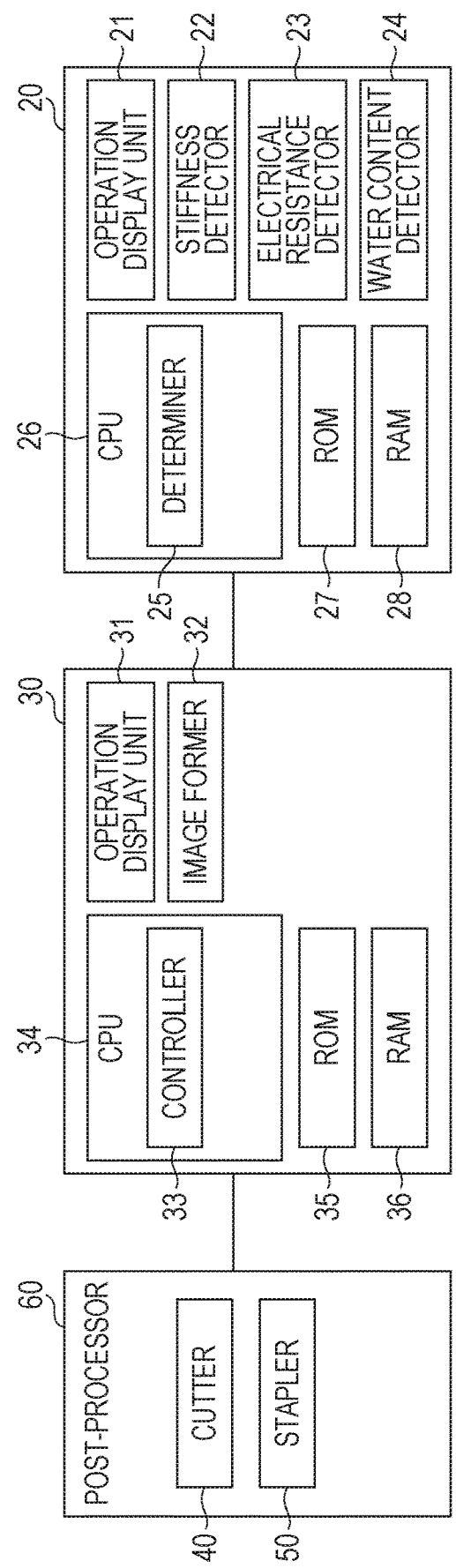
FIG. 2 is a block diagram showing an example of a functional configuration of the image forming system according to the first embodiment of the present invention.

Next, a functional configuration of the image forming system 1 according to the present embodiment will be described. FIG. 2 is a block diagram showing an example of the functional configuration of the image forming system 1 according to the present embodiment. FIG. 2 shows functional components of the medium detection apparatus 20 and the image forming apparatus 30 shown in FIG. 1. In addition, in FIG. 2, the cutter 40 and the stapler 50 shown in FIG. 1 are included in a post-processor (i.e., post-processing device) 60.

As shown in FIG. 2, the functional configuration of the medium detection apparatus 20 includes the operation display unit 21, the stiffness detector 22, the electrical resistance detector 23, the water content detector 24, a central processing unit (CPU) (i.e., hardware processor) 26, a read only memory (ROM) 27, and a random access memory (RAM) 28.

The operation display unit 21 includes a display unit including a display device such as a liquid crystal display (LCD) or an organic electro-luminescence (EL) display, and an operation unit including a touch sensor or the like. The display unit and the operation unit are integrally formed as, for example, a touch panel. An operator inputs medium information such as a paper type and a weight of a sheet by using the operation display unit 21. The operation display unit 21 outputs the medium information input by the operator to the determiner 25 of the CPU 26. Note that the operation unit may include a mouse, a tablet, or the like, and may be configured separately from the display unit.

The stiffness detector 22 holds a sheet by a roller, presses a pressing member against the sheet, and detects a pressure when the sheet is bent at a predetermined angle by a pressure sensor as a stiffness of the sheet. In the present embodiment, the stiffness detector 22 detects, as the stiffness of the sheet, the pressure when the sheet having a thickness of 20 mm and a width of 20 mm is bent at 15 degrees.

The electrical resistance detector 23 measures a current flowing when the sheet is sandwiched between detection rollers and a high voltage is applied to the sheet, and calculates an electrical resistance of the sheet by using the measured current and the applied voltage.

The water content detector 24 irradiates the sheet with a reference wavelength at which moisture is not absorbed and a measurement wavelength at which moisture is absorbed, measures reflected light of each of the reference wavelength and the measurement wavelength, and calculates absorbance of the sheet. Then, the water content detector 24 further calculates a water content of the sheet based on the calculated absorbance of the sheet.

The CPU 26 controls the medium detection apparatus 20 as a whole, and includes the determiner (determiner 25) as shown in FIG. 2.

The determiner (determiner 25) acquires the medium information input by the operator from the operation display unit 21. The determiner (determiner 25) further acquires the physical property information including the stiffness, the electrical resistance, and the water content of the sheet from the physical property detector including the stiffness detector 22, the electrical resistance detector 23, and the water content detector 24. In addition, the determiner (determiner 25) performs setting processing (described in detail in FIG. 5 below) of the restriction content of the post-processing for the sheet detected by the physical property detector based on the acquired physical property information, the medium information input by the operator via the operation display unit 21, and the registered post-processing restriction information (described in detail in FIGS. 3A and 3B below).

The ROM 27 includes, for example, a storage medium such as a nonvolatile memory, and stores programs or instructions, data, and the like executed and referred to by the CPU 26. The ROM 27 is used as an example of a non-transitory computer-readable storage medium (or recording medium) storing a program or instruction to be executed by the medium detection apparatus 20.

The RAM 28 includes, for example, a storage medium such as a volatile memory, and temporarily stores information data necessary for each processing performed by the CPU 26.

As shown in FIG. 2, the functional configuration of the image forming apparatus 30 includes an operation display unit 31, an image former (i.e., image forming device) 32, a CPU 34, a ROM 35, and a RAM 36.

The operation display unit 31 includes a display unit including a display device such as an LCD or an organic EL display, and an operation unit including a touch sensor or the like. The display unit and the operation unit are integrally formed as, for example, a touch panel. The operation display unit 31 generates an operation signal indicating operation content (print job, post-processing job, and the like) input from the operator to the operation unit, and feeds the operation signal to the controller 33. In addition, the operation display unit 31 displays the operation content, setting information, and the like by the operator on the display unit based on the display signal fed from the controller 33. Note that the operation unit may include a mouse, a tablet, or the like, and may be configured separately from the display unit.

The image former 32 has a function of forming an image on a sheet, and includes an image forming unit of Y, M, C, and K that form toner images of four colors of yellow (Y), magenta (M), cyan (C), and black (K) on a sheet.

The CPU 34 controls the image forming apparatus 30 as a whole, and includes the controller 33 as shown in FIG. 2.

The controller 33 controls operation of each unit in the image forming apparatus 30. For example, the controller 33 controls image forming processing in the image former 32, controls various types of post-processing in the post-processor 60, and the like based on a print instruction performed by the operator via the operation display unit 31. In addition, the controller 33 receives, from the operation display unit 31, settings of a print job and a post-processing job by the operator, registration of a post-processing function in the post-processor 60, and the like.

The ROM 35 includes, for example, a storage medium such as a nonvolatile memory, and stores programs or instructions, data, and the like executed and referred to by the CPU 34. The ROM 35 is used as an example of a non-transitory computer-readable storage medium (or recording medium) storing a program or instruction to be executed by the image forming apparatus 30.

The RAM 36 includes, for example, a storage medium such as a volatile memory, and temporarily stores information data necessary for each processing performed by the CPU 34.

The post-processor 60 includes the cutter 40 having a cutting function and the stapler 50 having a stapling function. The post-processing function of the post-processor 60 is not limited to including the cutting function and the stapling function. For example, the post-processing function may include at least one of the cutting function and the stapling function, or may include other post-processing functions such as a punching function and a folding function. Since the cutter 40 and the stapler 50 have been described with reference to FIG. 1, redundant description will be omitted.

Next, the registered post-processing restriction information in the image forming system 1 according to the present embodiment will be described. The registered post-processing restriction information includes, for example, restriction content of post-processing with respect to a plurality of types of recording media (sheets) such as coated paper and non-coated paper, and is registered for each post-processing function included in the post-processor 60. The registered post-processing restriction information is information registered in the medium detection apparatus 20 by the operator. FIGS. 3A and 3B are diagrams each showing a data example 1 of the registered post-processing restriction information in the image forming system 1 according to the present embodiment. Note that the registered post-processing restriction information shown in FIGS. 3A and 3B is registered in advance for the cutting function of the cutter 40. FIG. 3A is a diagram showing registered post-processing restriction information for coated paper, and FIG. 3B is a diagram showing registered post-processing restriction information for non-coated paper.

Since the configuration of the data examples of the registered post-processing restriction information shown in FIGS. 3A and 3B are similar, the following description will be given by using FIG. 3A as an example, and the description of FIG. 3B will be omitted.

As shown in FIG. 3A, the registered post-processing restriction information includes information of "paper type", "weight", "stiffness", "electrical resistance", "water content", and "post-processing restriction number". The column of "paper type" stores information indicating a paper type of a recording medium (sheet) which is a target of the registered post-processing restriction information, for example, information such as "coated paper" and "non-coated paper". Note that the "paper type" is information input by the operator via the operation display unit 21 of the medium detection apparatus 20.

The column of "weight" stores information indicating, in "grams per square meter (gsm)", the weighing of the sheet corresponding to the information indicated in the column of "paper type". For example, information of "0 to 100" gsm indicating a range of weight of sheet is stored. Note that the "weight" is information input by the operator via the operation display unit 21 of the medium detection apparatus 20.

The column of "stiffness" stores information, indicating in millinewton (mN), a minimum stiffness and a maximum stiffness of the sheet corresponding to the range of weight shown in the column of "weight". For example, the column stores information that the minimum stiffness of "coated paper" corresponding to the range of weight of "0 to 100" gsm is "0" mN and the maximum stiffness is "50" mN.

The column of "electrical resistance" stores information indicating, in megaohm (Me), a minimum electrical resistance and a maximum electrical resistance of the sheet corresponding to the range of weight indicated in the column of "weight". For example, the column stores information that the minimum electrical resistance of "coated paper" corresponding to the range of weight of "0 to 100" gsm is "0" MΩ, and the maximum electrical resistance is "$10^4$" MΩ.

The column of "water content" stores information indicating, in percentage (%), a minimum water content and a maximum water content of the sheet corresponding to the range of weight indicated in the column of "weight". For example, the column stores information that the minimum water content of "coated paper" corresponding to the range of weight of "0 to 100" gsm is "0"% and the maximum water content is "10"%.

Note that the "stiffness", "electrical resistance", and "water content" are physical property information detected by the physical property detector (medium detection apparatus 20).

The column of the "post-processing restriction number" stores an upper limit (restriction content) of the number of sheets (recording media) post-processable at one time by the post-processor 60, the number being set in accordance with the "paper type", "weight", "stiffness", "electrical resistance", and "water content". For example, as shown in FIG. 3A, restriction content is stored in which the upper limit of the number of sheets post-processable at one time is "100" sheets when the cutting function of the cutter 40 (post-processor 60) is used for a sheet having physical property information of "coated paper" (paper type), "0 to 100" gsm (weight), "0" mN (stiffness), "0" MΩ (electrical resistance), and "0"% (water content). In addition, for example, information ("inexecutable") indicating that the cutting function of the cutter 40 (post-processor 60) cannot be executed is stored for a sheet having physical property information of "coated paper" (paper type), "201 or more" gsm (weight), "1000" mN (stiffness), "$10^4$" MΩ (electrical resistance), and "10"% (water content). That is, the restriction content also includes information indicating whether the post-processing on the recording medium can be executed.

As shown in FIG. 3A, the post-processing restriction number of "80" sheets corresponding to the weight of "0 to 100" gsm, the stiffness of "50" mN, the electrical resistance of "0" MΩ, and the water content of "0"% is set to be smaller than the post-processing restriction number of "100" sheets corresponding to the weight of "0 to 100" gsm, the stiffness of "0" mN, the electrical resistance of "0" MΩ, and the water content of "0"%. That is, the upper limit ("post-processing restriction number") of the number of sheets of recording media post-processable at one time by the cutter 40 (post-processor 60) is set to be smaller as the stiffness is greater. When the stiffness of the sheet is greater, cutting and stapling cannot be performed, and therefore, the upper limit of the processable number is required to be small.

In addition, as shown in FIG. 3A, the post-processing restriction number of "90" sheets corresponding to the weight of "0 to 100" gsm, the stiffness of "0" mN, the electrical resistance of "$10^4$" MΩ, and the water content of "0"% is set to be smaller than the post-processing restriction number of "100" sheets corresponding to the weight of "0 to 100" gsm, the stiffness of "0" mN, the electrical resistance of "0" MΩ, and the water content of "0"%. That is, the upper limit ("post-processing restriction number") of the number of sheets of recording media post-processable at one time by the cutter 40 (post-processor 60) is set to be smaller as the electrical resistance is greater. When the electrical resistance is great, the sheets are easily charged, and when a charge amount is large, stacking is easily disturbed due to repulsion caused by Coulomb force, and the sheets are hardly aligned. When the sheets are hardly aligned, cutting and stapling cannot be performed, and therefore, the upper limit of the processable number is required to be small.

In addition, as shown in FIG. 3A, the post-processing restriction number of "90" sheets corresponding to the weight of "0 to 100" gsm, the stiffness of "0" mN, the electrical resistance of "0" MΩ, and the water content of "10"% is set to be smaller than the post-processing restriction number of "100" sheets corresponding to the weight of "0 to 100" gsm, the stiffness of "0" mN, the electrical resistance of "0" MΩ, and the water content of "0"%. That is, the upper limit ("post-processing restriction number") of the number of sheets of recording media post-processable at one time by the cutter 40 (post-processor 60) is set to be smaller as the water content is greater. When the water content is greater, the fiber texture of the sheet is loosened, the flexibility is increased, and the tear strength is improved, and therefore, the upper limit of the processable number is required to be small.

FIGS. 4A and 4B are diagrams each showing a data example 2 of the registered post-processing restriction information in the image forming system 1 according to the present embodiment. The registered post-processing restriction information shown in FIGS. 4A and 4B is registered in advance for the stapling function of the stapler 50. FIG. 4A is a diagram showing registered post-processing restriction information for coated paper, and FIG. 4B is a diagram showing registered post-processing restriction information for non-coated paper. Note that the configuration of the data example of the registered post-processing restriction information shown in FIGS. 4A and 4B is similar to the configuration of the post-processing restriction information described in FIGS. 3A and 3B, and thus redundant description will be omitted.

Next, description will be made of a method of calculating the upper limit of the number of the sheet to be used (target sheet) post-processable at one time by the post-processor 60 based on the registered post-processing restriction information (see FIGS. 3A, 3B, 4A, and 4B) in the image forming system 1. In the image forming system 1, the medium detection apparatus 20 detects physical property information such as the stiffness, electrical resistance, and water content of a sheet (target sheet) fed by the sheet feeding apparatus 10. Then, the determiner 25 of the medium detection apparatus 20 determines (calculates) the restriction content of post-processing (upper limit of the number of sheets post-processable at one time) for each post-processing function based on the registered post-processing restriction information for each post-processing function included in the post-processor 60 in accordance with the physical property information of the detected target sheet.

In the present embodiment, it is assumed that the target sheet detected by the medium detection apparatus 20 is a coated paper of 128 gsm, and the physical property information of the detected target sheet is the stiffness of 60 mN, electrical resistance of 3000 MΩ, and water content of 7%.

The determiner 25 of the medium detection apparatus 20 searches the registered post-processing restriction information for the cutting function shown in FIGS. 3A and 3B, for example, by using the physical property information of the target sheet, and then, the determiner 25 can specify that the physical property information of the target sheet is included in a hatched portion of the registered post-processing restriction information shown in FIG. 3A. In addition, the determiner 25 calculates the upper limit of the number of sheets post-processable at one time by the cutter 40 based on the specified registered post-processing restriction information (hatched portion in FIG. 3A).

FIG. 5 is a diagram for describing the method of calculating the upper limit of the number of sheets post-processable at one time by the post-processor 60 in the image forming system 1 according to the present embodiment. Procedure (1) in FIG. 5 shows the registered post-processing restriction information of the hatched portion in FIG. 3A. Procedure (2) in FIG. 5 shows the post-processing restriction information when the stiffness calculated based on the information shown in procedure (1) in FIG. 5 is 60 mN. Procedure (3) in FIG. 5 shows the post-processing restriction information when the electrical resistance further calculated based on the information shown in procedure (2) in FIG. 5 is 3000 MΩ. Procedure (4) in FIG. 5 shows the post-processing restriction information when the water content further calculated based on the information shown in procedure (3) in FIG. 5 is 7%.

From the post-processing restriction information shown in procedure (1) in FIG. 5, the medium detection apparatus 20 calculates interpolation coefficients for each of the stiffness, the electrical resistance, and the water content for calculating the upper limit of the number of target sheets post-processable at one time by the cutter 40. Specifically, for example, when the interpolation coefficient for the stiffness of "50" mN shown in procedure (1) in FIG. 5 is X, the interpolation coefficient for the stiffness of "200" mN is (1−X). Then, X when the sum of the values obtained by multiplying the stiffness of "50" mN and the stiffness of "200" mN by the respective interpolation coefficients is the stiffness of "60" mN is calculated. That is, X=0.93 is calculated by the following equation (1).

$$50X+200(1-X)=60 \quad (1)$$

In a similar manner, when the interpolation coefficient for the electrical resistance of "0" MΩ shown in procedure (1) in FIG. 5 is Y, Y=0.7 is calculated by the following equation (2).

$$0Y+10000(1-Y)=3000 \quad (2)$$

When the interpolation coefficient for the water content of "0"% shown in procedure (1) in FIG. 5 is Z, Z=0.3 is calculated by the following equation (3).

$$0Z+10(1-Z)=7 \quad (3)$$

The medium detection apparatus 20 uses the calculated interpolation coefficients X, Y, and Z of the stiffness, electrical resistance, and water content to perform an interpolation operation on the "post-processing restriction number" shown in procedure (1) in FIG. 5.

First, the medium detection apparatus 20 calculates the sum of the results of multiplying the "post-processing restriction number" corresponding to each of the stiffness of "50" mN and "200" mN with the same electrical resistance and water content by the interpolation coefficients X and (1−X) shown in procedure (1) in FIG. 5 as the "post-processing restriction number" corresponding to the stiffness of "60" mN. For example, a result "68" (hatched portion of procedure (2) in FIG. 5) of rounding off the sum (67.55) of the result (65.1) of multiplying the interpolation coefficient 0.93 (X) by the number of "70" sheets (hatched portion of procedure (1) in FIG. 5) corresponding to the stiffness of "50" mN, the electrical resistance of "0" MΩ, and the water content of "0"% and the result (2.45) of multiplying the interpolation coefficient (1-0.93) by the number of "35" sheets (hatched portion of procedure (1) in FIG. 5) corresponding to the stiffness of "200" mN, the electrical resistance of "0" MΩ, and the water content of "0"% is calculated as the "post-processing restriction number" corresponding to the stiffness of "60" mN, the electrical resistance of "0" MΩ, and the water content of "0"%. Note that the "post-processing restriction number" corresponding to the stiffness of "60" mN, the other electrical resistances, and the other water contents is calculated in a similar manner to the above method. Each "post-processing restriction number" corresponding to the calculated stiffness of "60" mN is shown in procedure (2) in FIG. 5.

Next, the medium detection apparatus 20 calculates the sum of the results of multiplying the "post-processing restriction number" corresponding to each of the electrical resistance of "0" MΩ and "$10^{4}$" MΩ with the same water content by the interpolation coefficients Y and (1−Y) shown in procedure (2) in FIG. 5 as the "post-processing restriction number" corresponding to the electrical resistance of "3000" MΩ. For example, the result "65" (hatched portion of procedure (3) in FIG. 5) of rounding off the sum (65.0) of the result (47.6) obtained by multiplying the number of "68" sheets corresponding to the electrical resistance of "0" MΩ and the water content of "0"% by the interpolation coefficient 0.7 (Y) and the result (17.4) obtained by multiplying "58" corresponding to the electrical resistance of "$10^{4}$" MΩ and the water content of "0"% by the interpolation coefficient (1-0.7) is calculated as the "post-processing restriction number" corresponding to the stiffness of "60" mN, the electrical resistance of "3000" MΩ, and the water content of "0"%. Note that the "post-processing restriction number" corresponding to the stiffness of "60" mN, the electrical resistance of "3000" MΩ, and the other water contents is calculated in a similar manner to the above method. Each "post-processing restriction number" corresponding to the calculated stiffness of "60" mN and the electrical resistance of "3000" MΩ is shown in procedure (3) in FIG. 5.

Next, the medium detection apparatus 20 calculates the sum of the results of multiplying the "post-processing restriction number" corresponding to each of the water content of "0"% and "10"% by the interpolation coefficients Z and (1−Z) shown in procedure (3) in FIG. 5 as the "post-processing restriction number" corresponding to the water content of "7"%. The result "58" of rounding off the sum (58.0) of the result (19.5) obtained by multiplying the number of "65" sheets corresponding to the water content of "0"% by the interpolation coefficient 0.3 (Z) and the result (38.5) obtained by multiplying "55" corresponding to the water content of "10"% by the interpolation coefficient (1-0.3) shown in procedure (3) in FIG. 5 is calculated as the "post-processing restriction number" corresponding to the stiffness of "60" mN, the electrical resistance of "3000" MΩ, and the water content of "7"% (see procedure (4) in FIG. 5). That is, the number of "58" sheets shown in procedure (4) in FIG. 5 is determined as the restriction content (upper limit of the number of sheets post-processable at one time by the post-processing machine) of the cutting function (post-processing) for coated paper of 128 gsm having physical property information of the stiffness of 60 mN, electrical resistance of 3000 MΩ, and water content of 7%.

[Setting Processing of Restriction Content of Post-Processing]

Figure 6:
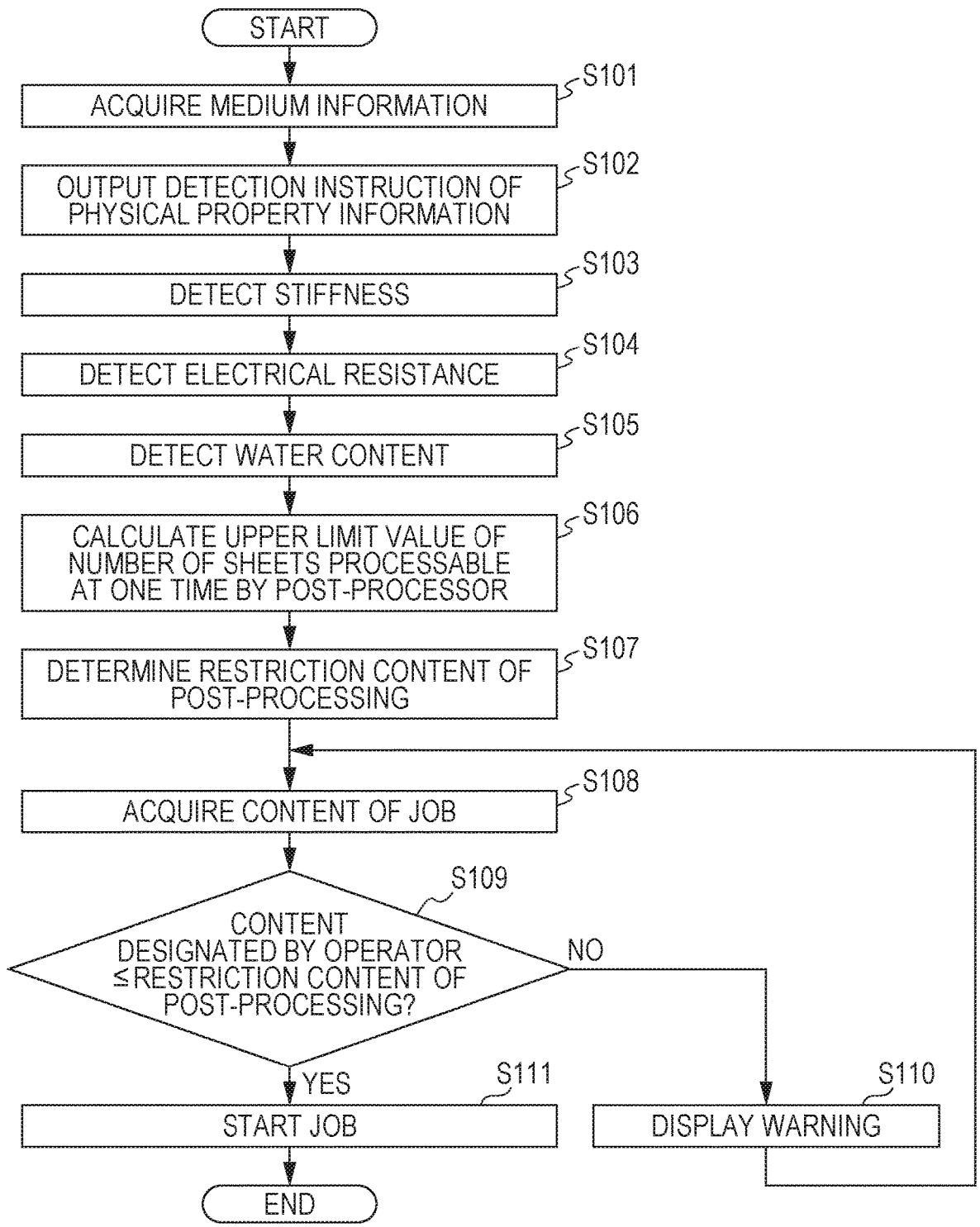
FIG. 6 is a flowchart showing a procedure of setting processing of restriction content of post-processing in the image forming system according to the first embodiment of the present invention.

Next, the setting processing of the restriction content of the post-processing in the image forming system 1 will be described. FIG. 6 is a flowchart showing a procedure of the setting processing of the restriction content of the post-processing in the image forming system 1 according to the present embodiment. In the present embodiment, it is assumed that the number of types of target sheets of the post-processing is one. The processing described below starts when the operator inputs the medium information including the information of the paper type and the weight of the target sheet by using the operation display unit 21 of the medium detection apparatus 20 and issues a detection instruction of the physical property information.

First, the operation display unit 21 of the medium detection apparatus 20 acquires the medium information of the target sheet input by the operator (step S101).

Next, the operation display unit 21 outputs the acquired medium information and a detection instruction of physical property information by the operator to the determiner 25 (step S102). In this processing, the determiner 25 instructs the stiffness detector 22, the electrical resistance detector 23, and the water content detector 24 to detect the physical property information of the target sheet fed by the sheet feeding apparatus 10.

Next, the stiffness detector 22 detects the stiffness of the target sheet fed from the sheet feeding apparatus 10 and outputs the stiffness to the determiner 25 (step S103).

Then, the electrical resistance detector 23 detects the electrical resistance of the target sheet fed from the sheet feeding apparatus 10 and outputs the electrical resistance to the determiner 25 (step S104).

Thereafter, the water content detector 24 detects the water content of the target sheet fed from the sheet feeding apparatus 10 and outputs the water content to the determiner 25 (step S105).

Subsequently, the determiner 25 calculates the upper limit of the number of the target sheet post-processable at one time by the post-processor 60 based on the registered post-processing restriction information (see FIGS. 3A, 3B, 4A, and 4B) and the detected physical property information of the target sheet (step S106).

Next, the determiner 25 determines the upper limit of the number of the calculated target sheet post-processable at one time by the post-processor 60 as the restriction content of the post-processing (step S107).

Then, the determiner 25 acquires the content of the post-processing job input by the operator from the image forming apparatus 30 (step S108). The post-processing job includes the content in which, for example, 70 sheets of coated paper of 128 gsm are subjected to the cutting processing.

Next, the determiner 25 determines whether the content designated by the operator is equal to or less than the determined restriction content of the post-processing (upper limit of the number of sheets post-processable at one time by the post-processor 60) (step S109). Note that the content designation by the operator is the processing number (for example, 70 or the like) of target sheets included in the content of the post-processing job input by the operator.

In the processing of step S109, when the determiner 25 determines that the content designated by the operator is not equal to or less than the determined restriction content of the post-processing (NO in step S109), the post-processor 60 cannot appropriately execute the post-processing. Therefore, the determiner 25 controls the operation display unit 21 to display warning information indicating that the content designated by the operator exceeds the restriction content of the post-processing (step S110). After the processing of step S110, the processing returns to step S108, and the processing of steps S108 and S109 is repeatedly executed.

In the processing of step S109, when the determiner 25 determines that the specified content of the operator is equal to or less than the determined restriction content of post-processing (step S109 is YES), the controller 33 of the image forming apparatus 30 starts the post-processing job input by the operator (step S111). After the processing of step S111, the setting processing of the restriction content of the post-processing ends.

[Technical Improvements]

As described above, in the image forming system 1 according to the present embodiment, the physical property detector detects the physical property information including the stiffness, electrical resistance, and water content of the target sheet (recording medium), and determines the restriction content of the post-processing on the target sheet (recording medium) based on the registered post-processing restriction information in accordance with the detected physical property information. Therefore, the image forming system 1 according to the present embodiment can appropriately set the restriction content of the post-processing function in accordance with the physical property information of the recording medium.

Second Embodiment

Next, setting processing of restriction content of post-processing in the image forming system 1 according to a second embodiment of the present invention will be described. Since the configuration of the image forming system 1 according to the second embodiment is similar to the configuration of the image forming system 1 according to the first embodiment shown in FIGS. 1 and 2, redundant description will be omitted. In the second embodiment, it is assumed that different types (a plurality of types) of recording media (target sheets) are stored in each of the sheet feeding trays 11 and 12 shown in FIG. 1, and the operator inputs the content of post-processing for the plurality of types of recording media in the post-processing job. In this case, the physical property detector (the stiffness detector 22, electrical resistance detector 23, and water content detector 24 of the medium detection apparatus 20) detects the physical property information of each of the plurality of types of recording media included in the job for which the post-processing is instructed. The determiner (the determiner 25 of the medium detection apparatus 20) determines restriction content of post-processing on a plurality of types of recording media. In the present embodiment, processing for two types of target sheets will be described as an example, but the present invention is not limited thereto, and restriction content of post-processing can be set for three or more types of target sheets.

Figure 7:
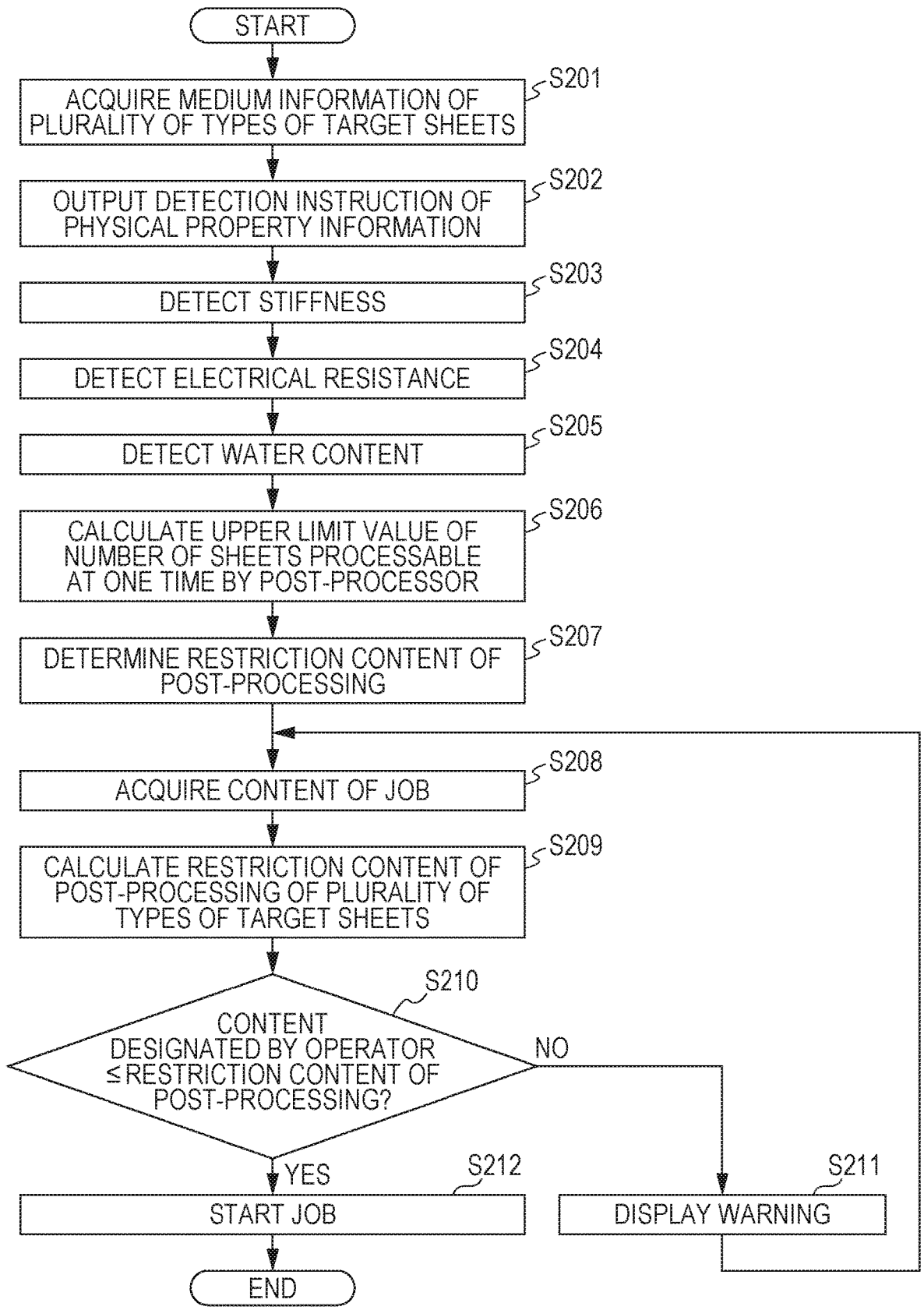
FIG. 7 is a flowchart showing a procedure of setting processing of restriction content of post-processing in an image forming system according to a second embodiment of the present invention.

FIG. 7 is a flowchart showing a procedure of the setting processing of the restriction content of the post-processing in the image forming system 1 according to the second embodiment. The processing described below starts when the operator inputs the medium information including the information of the paper type and the weight of the target sheet stored in each of the sheet feeding trays 11 and 12 by using the operation display unit 21 of the medium detection apparatus and issues a detection instruction of the physical property information.

First, the operation display unit 21 of the medium detection apparatus 20 acquires the medium information of the target sheets (a plurality of types of target sheets) stored in each of the sheet feeding trays 11 and 12 input by the operator (step S201).

Next, the operation display unit 21 outputs the acquired medium information and a detection instruction of physical property information by the operator to the determiner 25 (step S202). In this processing, the determiner 25 instructs the stiffness detector 22, the electrical resistance detector 23, and the water content detector 24 to detect the physical property information of the target sheet fed by each of the sheet feeding trays 11 and 12 of the sheet feeding apparatus 10.

Next, the stiffness detector 22 detects the stiffness of each of the plurality of types (two types) of target sheets fed from the sheet feeding apparatus 10 and outputs the stiffness to the determiner 25 (step S203).

Then, the electrical resistance detector 23 detects the electrical resistance of each of the two types of target sheets fed from the sheet feeding apparatus 10 and outputs the electrical resistance to the determiner 25 (step S204).

Thereafter, the water content detector 24 detects the electrical resistance of each of the two types of target sheets fed from the sheet feeding apparatus 10 and outputs the water content to the determiner 25 (step S205).

Subsequently, the determiner 25 calculates the upper limit of the number of each of the two types of target sheets post-processable at one time by the post-processor 60 based on the registered post-processing restriction information (see FIGS. 3A, 3B, 4A, and 4B) and the detected physical property information of the two types of target sheets (step S206).

Next, the determiner 25 determines the upper limit of the number of each of the calculated two types of target sheets post-processable at one time by the post-processor 60 as the restriction content of the post-processing for each of the two types of target sheets (step S207).

Then, the determiner 25 acquires and outputs the content of the post-processing job for the two types of target sheets, the post-processing job being input by the operator from the image forming apparatus 30 (step S208).

Thereafter, the determiner 25 integrates the restriction content of post-processing for the plurality of types (two types) of target sheets (step S209). In this processing, the determiner 25 calculates, as an integration result, the sum of the ratios of the processing number of each of the two types of target sheets included in the content of the post-processing job to the restriction content (upper limit number) of each post-processing. Specifically, for example, a post-processing job including information for performing the cutting processing for 50 sheets of coated paper of 128 gsm on the sheet feeding tray 11 and 2 sheets of non-coated paper of 250 gsm on the sheet feeding tray 12 is input. Then, the restriction content (upper limit number) of the post-processing for the coated sheet of 128 gsm on the sheet feeding tray 11 calculated in the processing of step S206 is 58 sheets, and the restriction content (upper limit number) of the post-processing for the non-coated paper of 250 gsm on the sheet feeding tray 12 is 22 sheets. In this case, the sum, that is, the integration result, of the ratio (86%) of the processing number (50 sheets) included in the content of the post-processing job for the coated paper of 128 gsm on the sheet feeding tray 11 to the restriction content (58 sheets) of post-processing and the ratio (9%) of the processing number (2 sheets) included in the content of the post-processing job for the non-coated paper of 250 gsm on the sheet feeding tray 12 to the restriction content (22 sheets) of post-processing is 95%.

Next, the determiner 25 determines whether the content designated by the operator is equal to or less than the determined restriction content of the post-processing (upper limit of the number of sheets post-processable at one time by the post-processor 60) (step S210). In this processing, when the integration result of the calculated restriction content of the post-processing of the plurality of types (two types) of target sheets is 100% or less, the determiner 25 determines that the content designated by the operator is equal to or less than the restriction content of the post-processing, and the processing of step S210 is determined as YES. Furthermore, when the integration result of the calculated restriction content of the post-processing of the plurality of types (two types) of target sheets exceeds 100%, the determiner 25 determines that the content designated by the operator is not equal to or less than the restriction content of the post-processing, and the processing of step S210 is determined as NO.

In the processing of step S210, when the determiner 25 determines that the content designated by the operator is not equal to or less than the determined restriction content of the post-processing (NO in step S210), the operation display unit 21 is controlled to display warning information indicating that the content designated by the operator exceeds the restriction content of the post-processing (step S211). After the processing of step S211, the processing returns to step S208, and the processing of steps S208 to S210 is repeatedly executed.

In the processing of step S210, when the determiner 25 determines that the specified content of the operator is equal to or less than the determined restriction content of post-processing (step S210 is YES), the controller 33 of the image forming apparatus 30 starts the post-processing job input by the operator (step S212). After the processing of step S212, the setting processing of the restriction content of the post-processing ends.

[Effects]

As described above, in the image forming system 1 according to the second embodiment, the physical property detector detects physical property information including the stiffness, electrical resistance, and water content of a plurality of types of target sheets (recording media) included in a post-processing job. Then, the determiner determines the restriction content of post-processing for each of the plurality of types of target sheets based on the registered post-processing restriction information in accordance with the detected physical property information of each of the plurality of types of target sheets. In addition, the determiner integrates the restriction content of the post-processing of the plurality of types of target sheets, and displays a warning when the content designated by the operator exceeds the integration result. Therefore, the image forming system 1 according to the present embodiment can also appropriately set the restriction content of the post-processing function in accordance with the physical property information of the plurality of types of target sheets (recording media).

Note that the plurality of sheet feeding trays may store the same type of target sheet. In some cases, even when the type of target sheet is the same, the physical property information such as the water content changes depending on, for example, a difference in an arrangement place of the sheet feeding tray and a time when the target sheet is stored in the sheet feeding tray. Therefore, the medium detection apparatus 20 can determine the restriction content of the post-processing for each target sheet stored in each sheet feeding tray by detecting the physical property information of the target sheet stored in each sheet feeding tray.

Third Embodiment

Figure 8:
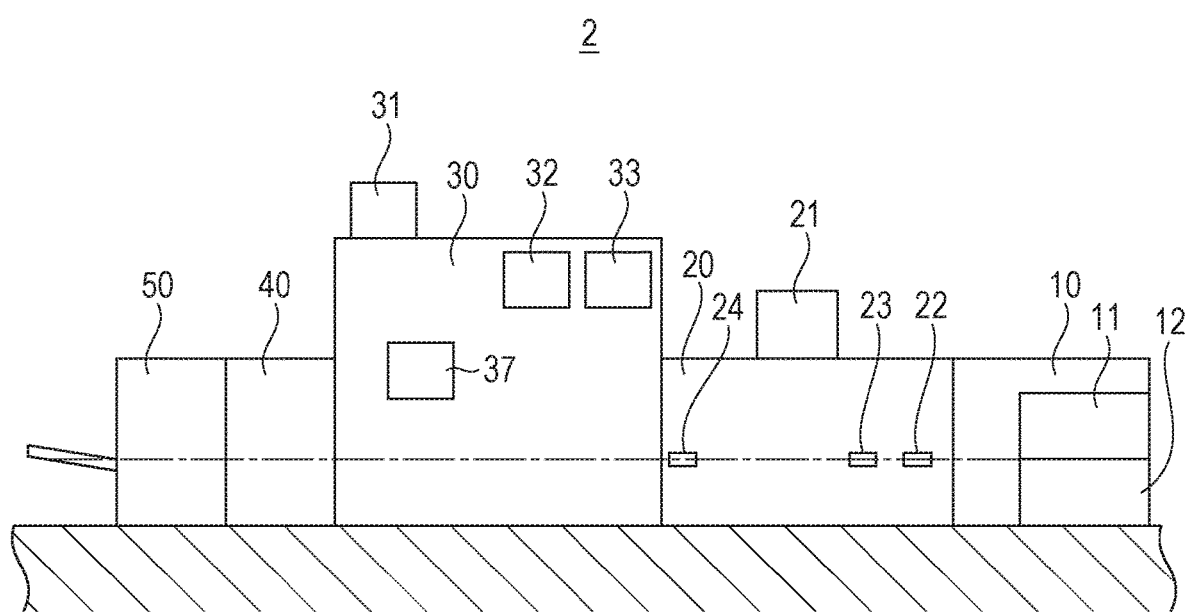
FIG. 8 is a diagram showing an external configuration of an image forming system according to a third embodiment of the present invention.

Next, a functional configuration of an image forming system 2 according to a third embodiment of the present invention will be described. FIG. 8 is a diagram showing an external configuration of the image forming system 2 according to the third embodiment of the present invention. As shown in FIG. 8, in the image forming system 2, the medium detection apparatus 20 does not include the determiner 25, and instead, the image forming apparatus 30 includes a determiner 37. Specifically, description will be made with reference to FIG. 9. Note that each component of the image forming system 2 other than the determiner 37 is similar to each component of the image forming system 1 shown in FIG. 1, and thus redundant description will be omitted.

Figure 9:
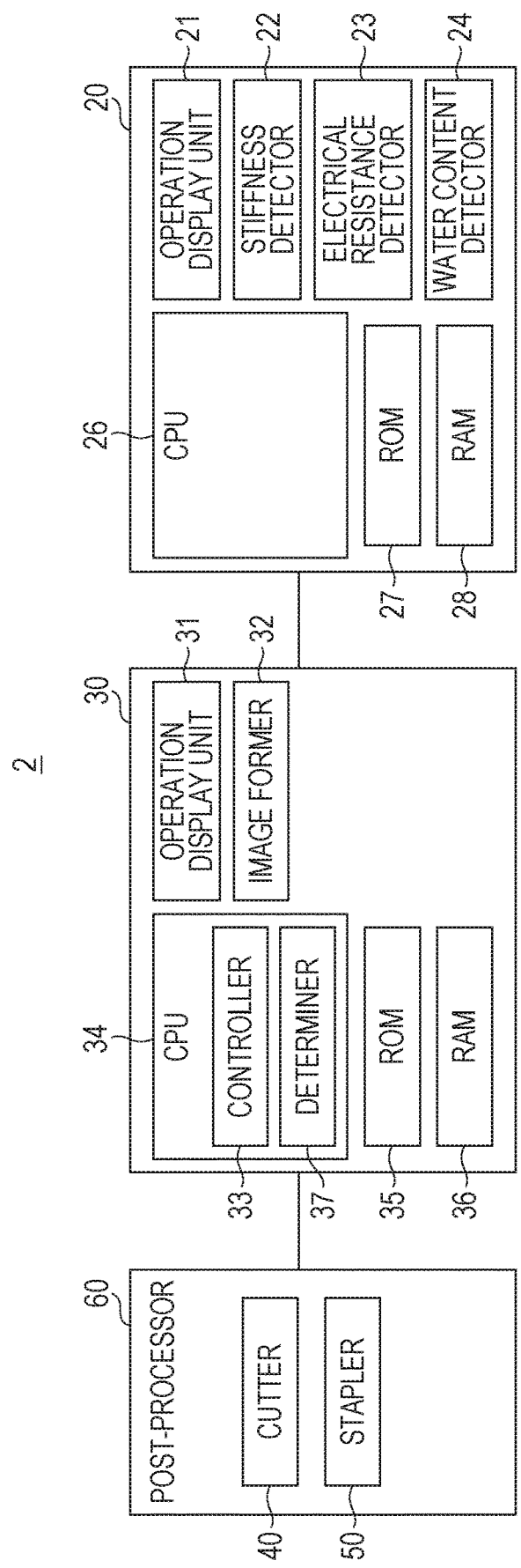
FIG. 9 is a block diagram showing an example of a functional configuration of the image forming system according to the third embodiment of the present invention.

FIG. 9 is a block diagram showing an example of a functional configuration of the image forming system 2 according to the third embodiment of the present invention. As can be seen by comparing FIGS. 9 and 2, in the image forming system 2, the CPU 26 of the medium detection apparatus 20 does not include the determiner 25, and instead, the CPU 34 of the image forming apparatus 30 includes the determiner 37. Further, in the present embodiment, it is assumed that registered post-processing restriction information (see FIGS. 3A, 3B, 4A, and 4B) is managed in the image forming apparatus 30.

The physical property detector (medium detection apparatus 20) detects physical property information including the stiffness, electrical resistance, and water content of a recording medium (target sheet) fed to the image former 32 of the image forming apparatus 30. The determiner (the determiner 37 of the image forming apparatus 30) acquires the detected physical property information of the recording medium (target sheet) from the medium detection apparatus 20. In addition, the determiner (determiner 37) acquires the medium information input by the operator via the operation display unit 21 from the medium detection apparatus 20. Furthermore, the determiner (the determiner 37) determines restriction content of post-processing for the recording medium based on registered post-processing restriction information in accordance with the acquired physical property information. Note that the setting processing of the restriction content of the post-processing of the target sheet based on the above various types of information acquired by the determiner (determiner 37) is similar to the setting processing of the restriction content of the post-processing in the determiner 25 of the medium detection apparatus 20 described with reference to FIGS. 6 and 7, and thus redundant description will be omitted.

[Effects]

As described above, in the image forming system 2 according to the third embodiment, the determiner that determines the restriction content of the post-processing in accordance with the physical property information of the target sheet (an example of the recording medium) is not provided in the medium detection apparatus 20, but is provided in the image forming apparatus 30. In the image forming system 2 having such a configuration, since the image forming apparatus 30 can determine the restriction content of the post-processing in accordance with the physical property information of the recording medium, any medium detection apparatus can be applied as long as the medium detection apparatus can detect the physical property information of the sheet. In addition, the image forming system 2 according to the third embodiment can obtain effects in a similar manner to the image forming system 1 according to the embodiments described above.

Note that the present invention is not limited to the above embodiments, and it goes without saying that various other application examples and modifications can be taken without departing from the gist of the present invention.

For example, in the above embodiments, the configuration of the image forming system has been described in detail and specifically for explanatory purpose, and the present invention is not necessarily limited to those having every configuration described above. In addition, some of the configurations of the embodiment described here can be replaced with a configuration of another embodiment, and furthermore, a configuration of the embodiment can be added to a configuration of another embodiment. Furthermore, as for some of the configurations of the embodiments, other configurations can be added, deleted, or replaced.

Control lines and information lines considered to be necessary for description are shown, and all the control lines and information lines in the product are not necessarily shown. In practice, it may be considered that almost all the configurations are connected to each other.

In the image forming system according to the above embodiments, the processing of determining the restriction content of the post-processing of the recording medium in accordance with the physical property information including the stiffness, electrical resistance, and water content has been described, but the present invention is not limited thereto. The image forming system according to the embodiments of the present invention can also determine the restriction content of the post-processing of the recording medium in accordance with the physical property information including at least one of the stiffness, electrical resistance, and water content.

In the above embodiments, the configuration example of the image forming system in which the medium detection apparatus 20 is disposed between the sheet feeding apparatus 10 and the image forming apparatus 30 has been described, but the present invention is not limited thereto. For example, the medium detection apparatus 20 may be disposed between the image forming apparatus 30 and the post-processor 60, or the medium detection apparatus 20 may be configured inside the sheet feeding apparatus 10 or the image forming apparatus 30. Furthermore, the medium detection apparatus 20 is not required to be disposed on a conveyance path of the recording medium. When the medium detection apparatus 20 is disposed in this manner, it is necessary for the operator to manually insert the target sheet of the post-processing into the medium detection apparatus 20. In addition, the medium detection apparatus 20 needs to have a function of transmitting the determined restriction content of the post-processing for the target sheet to the image forming apparatus 30 or the post-processor 60 via a network.

In the data example (FIGS. 3A and 3B) of the registered post-processing restriction information described in the above embodiments, a minimum value and a maximum value of the physical property information (stiffness, electrical resistance, and water content) of the recording medium are shown, but the present invention is not limited thereto. For example, when it is desired to improve the accuracy of the interpolation coefficient for each physical property information, a variable range (value between the minimum value and the maximum value) of each physical property information may be further finely divided, and the post-processing restriction information corresponding to each finely divided physical property information may be registered.

The program or instruction for implementing the functions of the determiners 25 and 37 that determine the restriction content of post-processing in accordance with the physical property information detected by the medium detection apparatus 20 according to the above embodiments may be stored in an executable manner in, for example, a PC, a cloud server, or the like connected to the image forming system. In this case, the restriction content of the post-processing determined by the program or instruction stored in the PC or the cloud server can be applied to the existing image forming system.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming system comprising:
    an image forming apparatus that forms an image on a recording medium;
    a post-processing device that executes post-processing to the recording medium on which the image is formed by the image forming apparatus;
    a physical property detector that detects physical property information of the recording medium; and
    a hardware processor that determines a restriction content of the post-processing based on registered post-processing restriction information depending on the physical property information having been detected, wherein
    the physical property information:
        indicates a physical property that changes due to an influence of a type and a location environment of the recording medium, and
        includes at least one of stiffness, electrical resistance, and water content of the recording medium,
    the restriction content includes an upper limit of a number of recording media that are post-processable at one time by the post-processing device, and
    the hardware processor further sets the upper limit of the number of recording media to be smaller as the water content is greater.

2. The image forming system according to claim 1, wherein
    the registered post-processing restriction information includes the restriction content with respect to a plurality of types of recording media.

3. The image forming system according to claim 1, wherein
    the restriction content indicates whether the post-processing is executable to the recording media.

4. The image forming system according to claim 1, wherein
    the hardware processor sets the upper limit of the number of recording media to be smaller as the stiffness is greater.

5. The image forming system according to claim 1, wherein
    the hardware processor sets the upper limit of the number of recording media to be smaller as the electrical resistance is greater.

6. The image forming system according to claim 1, wherein
    the hardware processor sets the restriction content for each post-processing function that the post-processing device has.

7. The image forming system according to claim 6, wherein
    the post-processing function includes at least one of a cutting function and a stapling function.

8. The image forming system according to claim 1, wherein
    the hardware processor determines the restriction content with respect to a plurality of types of recording media included in a job that instructs the post-processing.

9. The image forming system according to claim 1, wherein
    the hardware processor is disposed between the image forming apparatus and a recording medium feeder that feeds the recording medium to the image forming apparatus.

10. An image forming apparatus comprising:
    an image forming device that forms an image on a recording medium; and
    a hardware processor that acquires physical property information of the recording medium fed to the image forming device from a physical property detector that detects the physical property information, and determines a restriction content of post-processing with respect to the recording medium based on registered post-processing restriction information depending on the physical property information having been acquired, wherein
    the physical property information:
        indicates a physical property that changes due to an influence of a type and a location environment of the recording medium, and
        includes at least one of stiffness, electrical resistance, and water content of the recording medium,
    the restriction content includes an upper limit of a number of recording media that are post-processable at one time by the post-processing device, and
    the hardware processor further sets the upper limit of the number of recording media to be smaller as the water content is greater.

11. A non-transitory computer-readable recording medium storing instructions causing an information processing apparatus to execute:
    acquiring physical property information of a recording medium; and
    determining a restriction content of post-processing with respect to the recording medium based on registered post-processing restriction information depending on the physical property information having been acquired, wherein
    the physical property information:
        indicates a physical property that changes due to an influence of a type and a location environment of the recording medium, and
        includes at least one of stiffness, electrical resistance, and water content of the recording medium,
    the restriction content includes an upper limit of a number of recording media that are post-processable at one time by the post-processing device, and
    the instructions further cause the information processing apparatus to execute:

setting the upper limit of the number of recording media to be smaller as the water content is greater.

* * * * *